United States Patent
Zeira et al.

(10) Patent No.: US 6,714,523 B2
(45) Date of Patent: Mar. 30, 2004

(54) ASSIGNING PHYSICAL CHANNELS TO TIME SLOTS USING A FRAGMENTATION PARAMETER IN A HYBRID TIME DIVISION MULTIPLE ACCESS/CODE DIVISION MULTIPLE ACCESS COMMUNICATION SYSTEM

(75) Inventors: Eldad Zeira, Huntington, NY (US); Guodong Zhang, Ronkonkoma, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 535 days.

(21) Appl. No.: 09/854,726

(22) Filed: May 14, 2001

(65) Prior Publication Data

US 2003/0026227 A1 Feb. 6, 2003

(51) Int. Cl.[7] .............................................. H04B 7/216
(52) U.S. Cl. ...................... 370/320; 370/335; 370/342; 370/441; 455/452
(58) Field of Search ................................. 370/320, 321, 370/329, 335, 337, 437, 441, 479, 330, 341, 342; 455/450, 451, 452, 509, 513

(56) References Cited

U.S. PATENT DOCUMENTS

| | | | |
|---|---|---|---|
| 5,260,967 A | | 11/1993 | Schilling |
| 5,481,533 A | | 1/1996 | Honig et al. |
| 5,533,013 A | | 7/1996 | Leppanen |
| 5,963,865 A | * | 10/1999 | Desgagne et al. .......... 455/450 |
| 6,519,240 B1 | * | 2/2003 | Dillinger et al. ............ 370/337 |

OTHER PUBLICATIONS

TS C104 V2.1.0, China Wireless Telecommunication Standard, pp. 1–11, 1999.*
3G TR 25. 922, Technical Specification Group Radio Access Network, pp. 1–57, 1999.*
Anderlind, Resource Allocation in Multi–Service Wireless Access Networks, Thesis, pp. 1–148, Royal Institute of Technology, Sweden, Oct. 1997.*
El–Khamy et. al. "Wireless Portable Communication Using Pre–Rake CDMA/TDD/QPSK Systems With Different Combining Techniques And Imperfect Channel Estimation" IEEE, May 1997, pp. 529–533.
Povey, TDD–CDMA "Extension to FDD–CDMA Based Third Generation Cellular System" IEEE, Aug. 1997, pp. 813–817.
Mihailescu et al., "Dynamic Resource Allocation For Packet Transmission In UMTS TDD TD–CDMA Systems" IEEE. Feb. 1999, pp. 1737–1741.
Qingyu et al., "An Analysis of the Interference in the TDD–CDMA System" IEEE, Aug. 2000, pp. I–333–I–337.
Haas, et al. "A Novel Channel Assignment Approach in TDMA/CDMA–TDD Systems" IEEE, Jan. 2001, pp. E–142–E–146.
Zhang et al., "A Dynamic Channel Allocation Algorithm in TDD Mode CDMA Systems" IEEE, Aug. 2001, pp. 385–388.

* cited by examiner

*Primary Examiner*—Frank Duong
(74) *Attorney, Agent, or Firm*—Volpe and Koenig, P.C.

(57) ABSTRACT

A physical channel of a user service is provided for assignment to a set of time slots in a hybrid time division multiple access/code division multiple access wireless communication system. A measure of interference is determined for each of the set of time slots. A fragmentation parameter is provided. The fragmentation parameter represents a preference for fragmenting user service physical channels over time slots. The user service physical channel is assigned to one of the set of time slots using the measured interference associated with each of the set of time slots and the fragmentation parameter.

27 Claims, 6 Drawing Sheets

| 92 | 94 | 96 |
|---|---|---|
| THE CHANNELS OF THE NEW USER SERVICE ARE ORDERED BY THEIR DESIRED RECEPTION QUALITY, SUCH AS A SIR | DETERMINE DOWNLINK PHYSICAL CHANNELS FOR A REASSIGNMENT USING A QUALITY ESTIMATE | DETERMINE UPLINK PHYSICAL CHANNELS FOR REASSIGNMENT USING A FRAGMENTATION GAUGE |
| FIG. 7A | FIG. 7B | FIG. 7C |

THE TIME SLOTS OF THE "BAD" CCTrCH ARE ORDERED FROM HIGH INTERFERENCE TO LOW INTERFERENCE — 98

IN THE TIME SLOT ORDER, ATTEMPT TO REASSIGN PHYSICAL CHANNELS IN DECREASING ORDER OF REQUIRED SIR — 100

FIG. 7D

ASSIGNING PHYSICAL CHANNELS TO TIME SLOTS USING A FRAGMENTATION PARAMETER IN A HYBRID TIME DIVISION MULTIPLE ACCESS/CODE DIVISION MULTIPLE ACCESS COMMUNICATION SYSTEM

BACKGROUND

The invention generally relates to wireless hybrid time division multiple access/code division multiple access communication systems. In particular, the invention relates to resource management in such systems.

Figure 1:
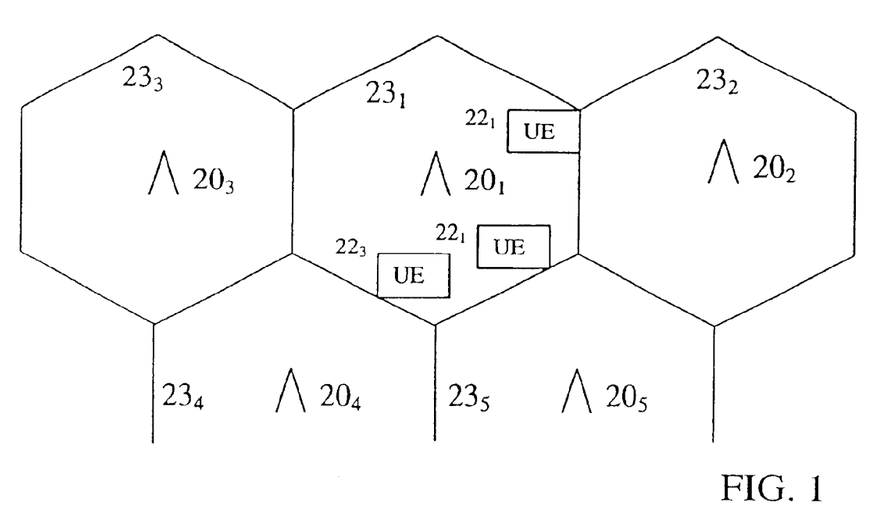
FIG. 1 is an illustration of a physical layout of a wireless communication system.

FIG. 1 depicts a physical layout of a wireless communication system. The system has a plurality of base stations 20. Each base station 20 communicates with user equipments (UEs) 22 in its operating area or cell 23. Communications transmitted from the base stations 20 to the UEs 22 are referred to as downlink communications and communications transmitted from the UEs 22 to the base stations 20 are referred to as uplink communications.

Figure 2:
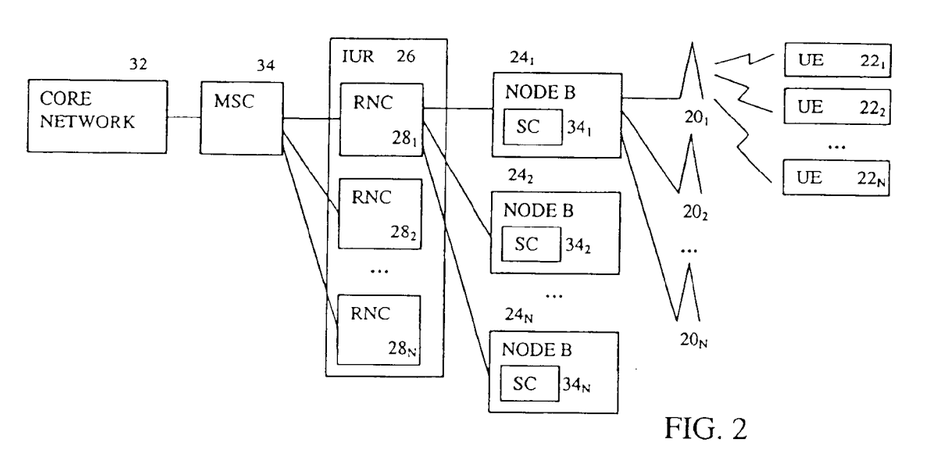
FIG. 2 is an illustration of a network layout of a wireless communication system.

A network perspective of a wireless communication system is shown in FIG. 2. Each node-B 24 within the system wirelessly communicates with associated UEs 22 or users. Each node-B 24 has a single site controller (SC) 34 associated with either a single or multiple base stations 20. A group of node-Bs 24 is connected to a radio network controller (RNC) $28_1$. To transfer communications between RNCs 28, an interface between the RNCs (IUR) 26 is utilized. Each RNC 28 is connected to a mobile switching center (MSC) 30 which in turn is connected to the core network 32.

In code division multiple access (CDMA) communication systems, multiple communications can be sent over the same spectrum simultaneously. The multiple communications are distinguished by their codes. In hybrid time division multiple access (TDMA)/CDMA communication systems, such as time division duplex (TDD) using CDMA (TDD/CDMA) communication systems, the spectrum is time divided into repeating frames having time slots, such as fifteen time slots. In such systems, communications are sent in selected time slots using selected codes. A physical channel is defined as one code in one time slot. The use of a single code in a single time slot with a spreading factor of sixteen is referred to as a resource unit. Based on the type of service being provided to a user (UE 22) in the system, one or multiple physical channels may be assigned to support the users uplink and downlink communications.

The assignment of physical channels to users in such a system is a complex problem. Each physical channel used in a time slot creates interference with respect to other channels used in that time slot. Accordingly, it is desirable to choose time slots as to minimize interference.

However, there are drawbacks to choosing time slots solely based on interference. A UE 22 communicating using less time slots typically will have a lower power consumption. By stacking codes in a smaller number of time slots, other time slots are left open for new users. Additionally, some UEs 22 may be only able to use a few time slots, such as one or two.

Accordingly, it is desirable to have effective resource management in hybrid TDMA/CDMA communication systems.

SUMMARY

A physical channel of a user service is provided for assignment to a set of time slots in a hybrid time division multiple access/code division multiple access wireless communication system. A measure of interference is determined for each of the set of time slots. A fragmentation parameter is provided. The fragmentation parameter represents a preference for fragmenting user service physical channels over time slots. The user service physical channel is assigned to one of the set of time slots using the measured interference associated with each of the set of time slots and the fragmentation parameter.

DETAILED DESCRIPTION OF THE PREFERRED EMBODIMENT(S)

Radio resource management (RRM) is a continuous process of allocating physical resources to users (UEs 22) in an acceptable resource allocation. RRM is used to find an efficient solution in view of the aggregate demand for resource units by all users.

Figure 3:
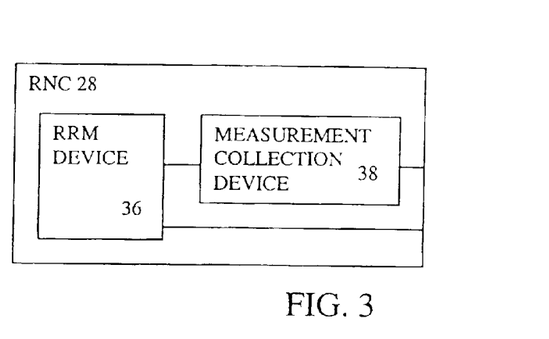
FIG. 3 is a simplified radio network controller using radio resource management.

FIG. 3 is a simplified RNC 28 for use in RRM. The RNC 28 has a RRM device 36 and a measurement collection device 38. The measurement collection device 38 collects various measurements from other components of the network, such as the node-Bs 24 and the UEs 22. These measurements include transmission power levels (both uplink and downlink), pathloss information and other information. The RRM device 36 uses the measurements in determining efficient assignment of resources which is sent to the other components.

Figure 4:
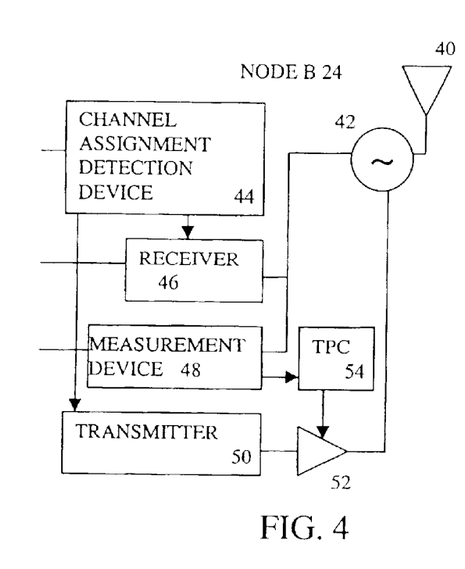
FIG. 4 is a simplified node-B using radio resource management.

FIG. 4 is a simplified node-B 24 for use in RRM. An antenna 40 receives radio frequency signals over a radio channel from the UEs 22. The received signals are passed through an isolator 42 to a receiver 46 and a measurement device 48. A channel assignment device 44, which receives channel assignments from the RNC 28, identifies the physical channels and time slots to allow the receiver 46 to detect the transmitted data. The receiver 46 may be a multiuser detection device (MUD), a RAKE or a different type of receiver. The receiver 46 also recovers signaled information from the UE 22, such as measurement information, which is relayed to the RNC 28.

A measurement device 48 takes various measurements at the node-B 24, such as interference levels and reception power levels. These measurements are also relayed to the RNC 28. A transmitter 50 sends data and signaled information, such as channel assignments and a transmission power level of the node-B transmitter 24, to the UEs 22. The channel assignment device 44 determines a transmission power level for the node-B transmitter 50. Although the following discussion usually refers to an open loop power control algorithm, other power control algorithms, such as closed loop, outer loop or a combination, may be used. The channel assignment device 44 controls the gain of an amplifier 52 to control the transmission power level. The transmitted signals pass through the isolator 42 and are radiated by the antenna 40.

Figure 5:
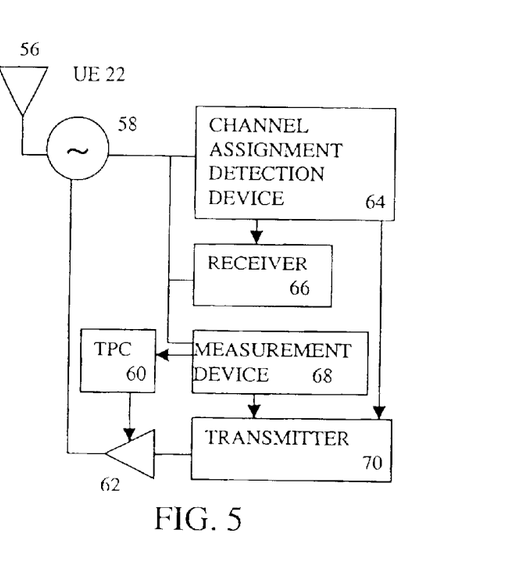
FIG. 5 is a simplified user equipment using radio resource management.

FIG. 5 is a simplified UE 22 for use in RRM. An antenna 56 receives radio frequency signals over a radio channel from the node-B 24. The received signals are passed through an isolator 58 to a receiver 66 and a measurement device 68. A channel assignment detection device 44 recovers the signaled information concerning the UE's channel assignments for both uplink and downlink. The receiver 66 may be a multiuser detection device (MUD), a RAKE or a different type of receiver.

A measurement device 68 takes various measurements at the UE 22, such as interference levels and reception power levels. These measurements are also relayed to the RNC 28 by being transmitted to the node-B 24. A transmitter 70 sends data and signaled information, such as measurements, pathloss information and a transmission power level of the UE transmitter 70, to the node-B 24. A transmit power controller (TPC) 60 determines a transmission power level for the node-B transmitter 60. The TPC 60 controls the gain of an amplifier 62 to control the transmission power level. The transmitted signals pass through the isolator 58 and are radiated by the antenna 56.

One procedure for assigning resource units in a TDMA/CDMA system, such as a TDD/CDMA system, uses fast dynamic channel allocation (F-DCA). F-DCA is the process of assigning the resource units to the users. F-DCA is typically invoked when a new or modified service is required, a handover of a user occurs or a change in interference levels occurs. Prior to F-DCA, an initial determination is made which slots are allowed for assignment. The allowed time slots may be based on interference measurements, such as measured by interference signal code power (ISCP), or other factors.

F-DCA has three primary roles. First, F-DCA is used to determine the resource units for initial allocation, handover or a user resource unit reconfiguration. A reconfiguration may occur as a result of another user or user service being dropped to allow for more efficient resource allocation. Second, F-DCA is an escape mechanism for a user or user service experiencing high interference or not capable of meeting a desired quality of service (QOS). Third, F-DCA is used as a tool to keep UE and system resource usage at reasonable levels at all times. There are two competing interests in efficient allocation of resource units: interference minimization and fragmentation. It is desirable to minimize the interference levels seen by the users. Minimum interference increases system capacity. Driving the interference levels down may spread the resource units over the most available time slots, reducing the number of resource units in each time slot.

However, it is also desirable to reduce the fragmentation of a user's resource units over multiple time slots. Using less time slots reduces a UE's power consumption and, accordingly, increases a UE's battery life. Reduced fragmentation also leaves slots available for new users. Some UEs 22 may be only capable of handling communications in a limited number of time slots, such as 1 or 2 time slots. For these UEs 22, reduced fragmentation is essential.

Figure 6:
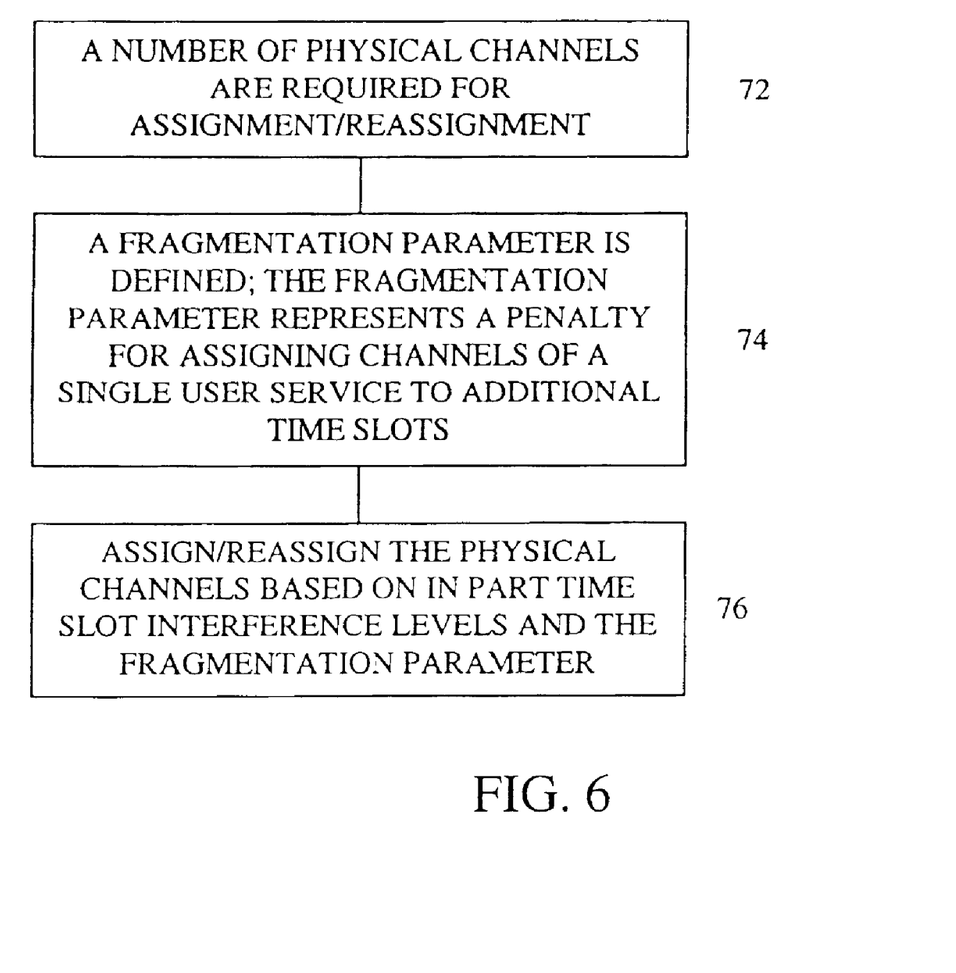
FIG. 6 is a flow chart of channel assignment/reassignment using a fragmentation parameter.

FIG. 6 is a flow chart of channel assignment using a fragmentation parameter. A UE 22 requires resource units for admittance, a new service or a change in units for reassignment (72). The RRM device 36 needs to assign resource units to the UE 22 to support the new service. The assignment of resource units may be limited by a maximum number of slots or physical channels per slot associated with that service's code composite transport channel (CCTrCH), such as three (3) time slots and three (3) physical channels per slot. In assigning resource units for this CCTrCH, the RRM device 36 utilizes the available time slots and their respective interference measurements. Based on this information, the RRM device 36 has a tendency to fragment the resource units over many time slots to reduce interference in all the time slots.

To reduce this tendency, a fragmentation parameter, $P_j$, is introduced to adjust the RRM device's resource unit assignment. Although the fragmentation parameter is preferably set so that a low value indicates a preference for and a high value indicates a strong preference against assigning the channel to that time slot, other parameter values may be used. $P_j$ represents the penalty for assigning a CCTrCH to j time slots (74). To illustrate, CCTrCH assigned to one time slot has a fragmentation parameter of $P_1$. $P_1$ represents zero or a low fragmentation penalty. A CCTrCH assigned to two time slots has a penalty $P_2$. $P_2$ represents the fragmentation penalty for using a second time slot and may be the same as $P_1$ indicating a non-penalty, slightly higher indicating a moderate penalty, or an "infinite" penalty indicating assignment to a second slot is not permitted. Further time slots used for a CCTrCH result in fragmentation penalties of $P_3 \ldots P_n$.

The fragmentation parameter values, typically, are set by an operator or by a mechanical device. The selection of fragmentation parameters is based on various factors, such as over-all interference levels and capacity. Examples of fragmentation penalties for a CCTrCH which can only support three (3) time slots and three (3) channels per slot is shown in Tables 1 and 2.

TABLE 1

$P_1 = 0$
$P_2 = 10$
$P_3 = 10$
$P_4$ to $P_n = \infty$

TABLE 2

$P_1 = 0$
$P_2 = 0$
$P_3 = 10$
$P_4$ to $P_n = \infty$

The value zero represents no penalty for fragmentation. The value 10 indicates a high penalty, such as 10 dB. The value ∞ indicates an "infinite" penalty, which prevents further fragmentation. The "infinite" penalty is a prohibitively high number. The values in table 1 represent a strong preference for using one time slot. The values in table 2 represent a strong preference for using one or two time slots. Using more than three slots is prohibited.

An alternate assignment scheme is per Equation 1.

$$P_j = \begin{Bmatrix} p \cdot j, \text{ where } j \leq C_{UE} \\ \infty, \text{ where } j > C_{UE} \end{Bmatrix} \quad \text{Equation 1}$$

$C_{UE}$ is the maximum number of allowed time slots for the CCTrCH. p is an incremental penalty value, such as 3 dB. To illustrate for a p=3 dB and a $C_{UE}$=3, the resulting fragmentation parameters are $P_1=0$ dB, $P_2=3$ dB, $P_3=6$ dB and $P_4 \ldots$ $P_N=\infty$. The RRM device 36 uses the fragmentation parameter and the interference measurements to assign the time slots (76).

Figure 7:
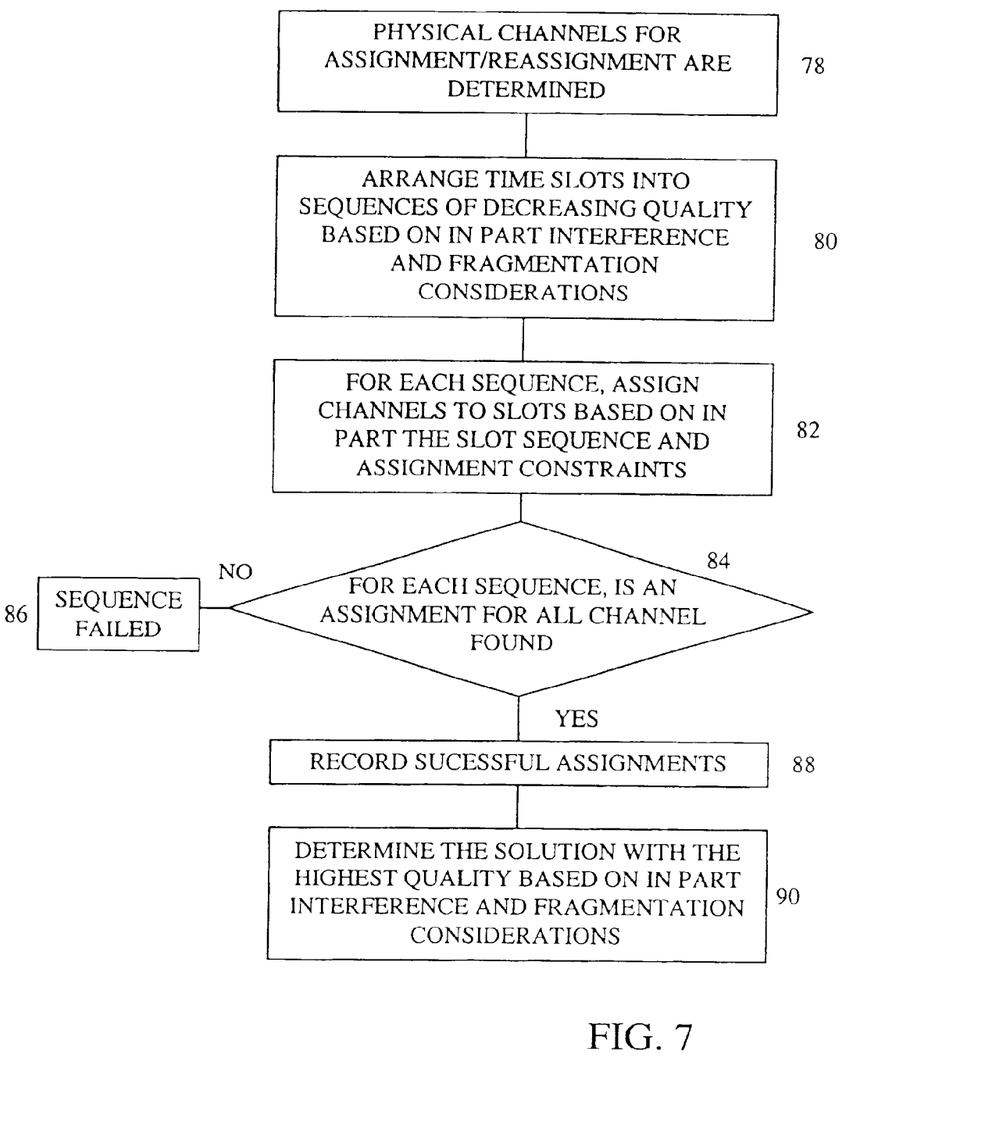
FIGS. 7–7D are flow charts of channel assignment/reassignment.

One role of F-DCA is to determine resource units at link setup. FIG. 7 is a flow chart for assigning resource units for a new UE 22 or new UE service. Physical channels are to be assigned to a CCTrCH (78). An estimation of the quality of each time slot with respect to interference and fragmentation is determined. The time slots are arranged in sequences of decreasing quality (80). One time slot quality measurement is a figure of merit, which is defined such as per Equation 4.

$$F_i = -\alpha \cdot \Delta I_i + \beta \cdot f(C_i) \qquad \text{Equation 4}$$

$F_i$ is the figure of merit for the $i^{th}$ time slot. $\Delta I_i$ is a difference between a measured interference level, such as using ISCP, at the receiver for the time slot and a minimum measured interference for all of the time slots. As a result, the time slot having the minimum measured interference has a $\Delta I_i$ of zero. $f(C_i)$ is the allowed number of physical channels for the CCTrCH in the $i^{th}$ time slot. $\alpha$ and $\beta$ are weighting factors.

To assign the physical channels, different sequences of time slots are derived. One approach varies the weights given to interference and fragmentation, such as by varying weights of the figure of merit. Sequences ordering the available time slots are determined based on altering the weights in the figure of merit and arranging the time slots in order of decreasing figure of merit. One scheme is as follows. k+m+1 sequences are derived by altering $\alpha$ and $\beta$ such as per Table 3.

TABLE 3

Favor low fragmentation:

$\alpha = 1, \beta = 2^0$ (Sequence 1)
$\alpha = 1, \beta = 2^1$ (Sequence 2)
$\alpha = 1, \beta = 2^2$ (Sequence 3)
...
$\alpha = 1, \beta = 2^K$ (Sequence k)
Favor low interference $\alpha = 2^1, \beta = 1$ (Sequence k + 1)
$\alpha = 2^2, \beta = 1$ (Sequence k + 2)
$\alpha = 2^3, \beta = 1$ (Sequence k + 3)
...
$\alpha = 2^m, \beta = 1$ (Sequence k + m + 1)

k is the number of low fragmentation sequences that are tried. k is typically an empirical value, such as 4, 5 or 6. m is the number of low interference sequences tried. m is also typically an empirical value, such as 4, 5 or 6. To reduce computational requirements, redundant determined sequences may be eliminated.

Figure 7A:
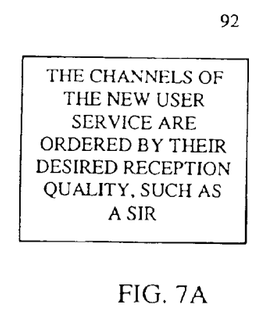

The channels for assignment are ordered by their desired reception quality (78 and 92 of FIG. 7A), such as by a signal to interference ratio (SIR). To illustrate using SIR, all the physical channels for assignment are arranged in decreasing order of their required SIR. For each sequence, the physical channels are assigned to the slots based on their order in the sequence. For each of the above k+m+1 sequences, starting with the first slot in the sequence, the first physical channel is tentatively added to that time slot, if there is at least one channel available for that UE 22. If the channel cannot be assigned to that time slot, the next time slot is tried and so on until the first channel is assigned to a time slot.

After assigning the first code to a time slot, the noise rise and required transmit power levels for the CCTrCH in this time slot is estimated. Based on the noise rise and required transmit power levels, a determination of whether this channel can be supported in this time slot is made. To illustrate, if any transmitter exceeds or is too close to its transmit power level capacity or noise rise exceeds a threshold, that channel cannot be added.

If a time slot cannot accept a physical channel, that time slot is eliminated from further consideration. That time slot sequence is updated not to include that time slot. Assignment of that channel to the next time slot in the sequence is attempted. If no time slots are found for the channel, this sequence fails and it is discarded (86). If the channel meets the users' transmit power requirements, the fragmentation penalty for the UE 22 is used to determine whether it is acceptable to assign that channel to this time slot. For example, a UE 22 is only capable of using 3 time slots. If this code assignment would involve a fourth time slot ($P_4=\infty$), this assignment is not acceptable and the sequence fails and is discarded (86). If the time slot is acceptable, the process continues with the next channel being added to the same time slot. When no channels are left, a potential assignment solution is found and recorded (84,88).

For each potential solution, the highest quality solution, such as a total predicted interference measurement adjusted for fragmentation for the physical channels, is determined (90). The weighted interference estimate for the CCTrCH is the summation of each physical channel's interference plus the fragmentation penalty for the whole CCTrCH. The recorded solution with the lowest fragmentation adjusted interference level is used to assign the physical channels to the service.

Another role of F-DCA is reassigning physical channels to either reduce interference or decrease fragmentation (pack slots), referred to as the "background operation." The desire to reassign may be due to a UE 32 ceasing a session and freeing up resources. It may also result from a suboptimal overall initial assignment or changes due to mobility or external causes.

A different approach is used for the uplink and downlink time slots. In other systems, uplink and downlink time slots may be assigned to the same slots. The following discussion is based on separate uplink and downlink time slots. However, for a system sending uplink and downlink transmissions in the same slot, an approach similar to that described for the downlink is used for all slots.

Figure 7B:
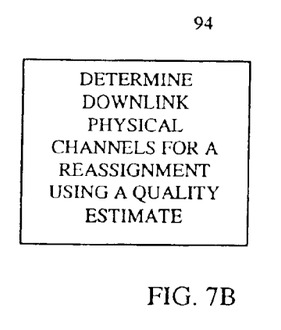

For reassigning downlink physical channels, a quality estimate, such as figure of merit, is determined for each downlink physical channel (78 and 94 of FIG. 7B). One approach to determine a figure of merit is per Equation 6.

$$F_i = -\tau \cdot \Delta I_i - \delta \cdot FR \qquad \text{Equation 6}$$

$F_i$ is the figure of merit for the $i^{th}$ channel. $\Delta I_i$ is the difference between the measured interference, such as ISCP, with respect to the $i^{th}$ channel in its time slot and the measured interference for the channel having the lowest measured interference. FR is a gauge of the fragmentation of the physical channel. One equation to determine FR is per Equation 7.

$$FR = \frac{\text{Total slots assigned to that channel's } CCTrCH}{\text{Number of physical channels in that channel's slot for that } CCTrCH} \qquad \text{Equation 7}$$

$\tau$ and $\delta$ are weighting factors.

The channels for potential reassignment are ordered by their quality into sequence of increasing quality. Using the figure of merit, the channels are ordered in increasing figure of merit. One approach to reduce the complexity of the reassignment is to only consider a threshold number of codes with the lowest figures of merit (first ones in the sequences). Alternately, a threshold value can be used. Only physical channels with a figure of merit below the threshold value are considered. Each physical channel for reassignment is treated differently. If no time slot has a lower interference measurement then a channel's current time slot, that channel cannot be reassigned. Any attempts to reassign that channel will only increase the interference in higher interference time slots.

After determining the physical channels for reassignment (78), the available time slots are ordered into sequences based on their quality adjusted for various weighting of interference and fragmentation, such as by altering the weights of the figure of merit. The sequences order the time slots by decreasing quality, such as by decreasing figure of merit.

One approach to determine the figure of merits is as follows. For the uplink, the figure of merit for each slot i is per Equation 8.

$$F_i = -\alpha_{UL} \cdot \Delta I_i + \beta_{UL} \cdot f(C_i) \qquad \text{Equation 8}$$

$\alpha_{UL}$ and $\beta_{UL}$ are weighting factors for the downlink. The figure of merit for each slot i is defined as per Equation 9.

$$F_i = -\alpha_{DL} \cdot \Delta T_i + \beta_{DL} \cdot f(C_i) \qquad \text{Equation 9}$$

where $\Delta T_i$ is defined as $T_i - T_{min}$. $T_i$ is the measured node-B slot transmit power in slot i. $T_{min}$ is the lowest node-B transmit power among all the downlink slots. In the uplink/downlink, time slots are examined one by one in the order of increasing figure of merit.

k+m+1 sequences are derived by altering $\alpha$ and $\beta$ such as per Table 3. For each sequence, starting with the first slot in that sequence, the potentially reassigned channel is added to that time slot, if there is at least one channel available for that channel's UE 22. If the channel cannot be assigned to that time slot, the next time slot is tried and so on until it is assigned to a time slot (82).

After assigning the channel to a time slot, the noise rise and required transmit power level for the CCTrCH in the time slot is estimated. Based on the noise rise and required transmit power levels, a determination of whether this channel can be supported in this time slot is made. To illustrate, if any transmitter exceeds or is too close to its transmitter power capacity or the noise rise exceeds a threshold, that channel cannot be added.

If the time slot cannot accept the channel, that time slot is eliminated from further consideration. The sequence is updated not to include that time slot. An attempt is made to assign this channel to the next time slot in the sequence. If no time slots are found for the channel, this sequence fails (86).

If the channel reassignment meets the transmit power requirements, the fragmentation penalty is used to determine whether it is acceptable to assign the channel to this time slot. If this assignment is not acceptable, this sequence fails (86). If the time slot is acceptable for this code assignment, the next channel in that sequence is attempted to be added to that time slot and the assignment process continues. If there are no remaining channels (84), an assignment solution is found and recorded (88). This process is repeated for each time slot sequence.

For each recorded solution, a weighted interference improvement is determined (90). The weighted interference improvement is the difference between the estimated interference of all the time slots for the proposed reassignment adjusted for fragmentation and the current measured interference adjusted for fragmentation. The reassignment with the largest improvement is compared to a reassignment margin. The reassignment margin prevents the oscillation between two close solutions and to prevent an unnecessary reassignment for only a minimal overall improvement. If the most improved reassignment exceeds the margin, that reassignment is initiated.

Figure 7C:
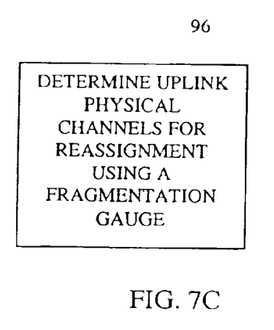

For the uplink time slots, since all physical channels in a time slot experience that same interference, the criteria for reassignment is the fragmentation gauge, FR. A high FR indicates high fragmentation and a low FR indicates low fragmentation. The reassignment channels are arranged from highest FR to lowest (78 and 96 of FIG. 7C). Although a reassignment analysis can be performed on all of the channels, preferable only a threshold number with high FRs are selected. Alternately, the channels having their FR exceeding a threshold are selected. After ordering the candidate channels, the reassignment procedure occurs the same as for the downlink per FIG. 7.

One other use for the reassignment procedure is to provide an escape mechanism for a user or user service experiencing high interference. When a user service experiences high interference, the RNC 28 attempts to reassign part or all of that service, CCTrCH, to reduce the interference. Prior to attempting reassignment, the measured interference of each potential reassignment time slot other than those used by the CCTrCH are checked to see if any are less than the highest measured interference time slot of the CCTrCH. If there is no better time slot, there is no reason to attempt reassignment.

Figure 7D:
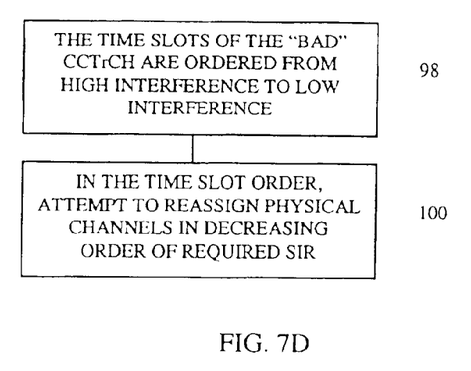

All physical channels that belong to the "bad" CCTrCH are examined to select which of them, including the possibility of all of them, are to be reassigned. Reassignment is attempted in order of slots from high interference down (98 of FIG. 7D). In each slot, physical channels are reassigned in order of decreasing required SIR (100 of FIG. 7D). The number of physical channels to be reassigned is determined as follows. At each reassignment, the interference in the new slot is computed or estimated as in the background operation. The average interference for all physical channels in the CCTrCH is computed. Reassignment stops when the average interference has dropped by a certain number of decibels, which is a design parameter.

One approach to simplify the assignment procedures is to eliminate time slots having an average measured interference over a threshold. After determining each time slot interference, the interference is compared to the threshold. The threshold may differ for uplink and downlink and from user to user. Time slots exceeding the threshold are eliminated from potential assignment. The threshold is set by an operator or a mechanical device, based on interference levels and capacity considerations.

What is claimed is:

1. A method for assigning a physical channel of a user service to time slots in a hybrid wireless time division multiple access/code division multiple access communication system, the method comprising:

providing a set of time slots for potential assignment;

determining a measure of interference for each of the set of time slots;

providing a fragmentation parameter, the fragmentation parameter representing a preference for fragmenting user service physical channels over time slots; and assigning the user service physical channel to one of the set of time slots using the measured interference associated with each of the set of time slots and the fragmentation parameter.

2. The method of claim 1 wherein the user service is associated with a code composite transport channel (CCTrCH) and the CCTrCH has a plurality of physical channels for time slot assignment.

3. The method of claim 1 wherein the interference measurement is measured using interference signal code power (ISCP).

4. The method of claim 1 wherein a value of the fragmentation parameter varies with respect to a number time slots used for the user service.

5. The method of claim 4 wherein a low value for the fragmentation parameter indicates a preference for assigning to the number of time slots of that fragmentation parameter and a high value indicates a preference against assigning to the number of time slots of that fragmentation parameter.

6. The method of claim 4 wherein the fragmentation parameter values are based on in part overall interference levels and capacity.

7. The method of claim 4 wherein an infinite value for the fragmentation parameter indicates a prohibition against assigning to the number of time slots of that fragmentation parameter.

8. The method of claim 7 wherein $C_{UE}$ is a maximum number of time slots associated with a user service, assigning channels of a user service to j time slots has the fragmentation parameter of $P_j$, an incremental penalty value is p, the $P_j$ is determined by $$P_j = \begin{cases} p \cdot j, \text{ where } j \leq C_{UE} \\ \infty, \text{ where } j > C_{UE} \end{cases}.$$

9. The method of claim 8 wherein p is 3 dB.

10. A radio network controller (RNC) for use in a hybrid wireless time division multiple access/code division multiple access communication system, the RNC assigning a physical channel of a user service to one of a set of time slots, the RNC comprising:
a radio resource management (RRM) device having an input configured to receive an interference measurement for each of the set of time slots, and for assigning the user service physical channel to one of the set of time slots using the interference measurement associated with each of the set of time slots and a fragmentation parameter, the fragmentation parameter representing a preference for fragmenting user service physical channels over time slots.

11. The RNC of claim 10 further comprising a measurement collection device for collecting measurements including the interference measurements and outputting the interference measurements to the RRM device.

12. The RNC of claim 11 wherein the user service is associated with a code composite transport channel (CCTrCH) and the CCTrCH has a plurality of physical channels for time slot assignment.

13. The RNC of claim 11 wherein the interference measurement is measured using interference signal code power (ISCP).

14. The RNC of claim 11 wherein a value of the fragmentation parameter varies with respect to a number time slots used for the user service.

15. The RNC of claim 14 wherein a low value for the fragmentation parameter indicates a preference for assigning to the number of time slots of that fragmentation parameter and a high value indicates a preference against assigning to the number of time slots of that fragmentation parameter.

16. The RNC of claim 14 wherein the fragmentation parameter values are based on in part overall interference levels and capacity.

17. The RNC of claim 14 wherein an infinite value for the fragmentation parameter indicates a prohibition against assigning to the number of time slots of that fragmentation parameter.

18. The RNC of claim 17 wherein $C_{UE}$ is a maximum number of time slots associated with a user service, assigning channels of a user service to j time slots has the fragmentation parameter of $P_j$, an incremental penalty value is p, the $P_j$ is determined by $$P_j = \begin{cases} p \cdot j, \text{ where } j \leq C_{UE} \\ \infty, \text{ where } j > C_{UE} \end{cases}.$$

19. The RNC of claim 18 wherein p is 3 dB.

20. A radio network controller (RNC) for use in a hybrid wireless time division multiple access/code division multiple access communication system, the RNC assigning a physical channel of a user service to one of a set of time slots, the RNC comprising:
means for receiving an interference measurement for each of the set of time slots;
means for assigning the user service physical channel to one of the set of time slots using the interference measurement associated with each of the set of time slots and a fragmentation parameter, the fragmentation parameter representing a preference for fragmenting user service physical channels over time slots.

21. The RNC of claim 19 wherein the user service is associated with a code composite transport channel (CCTrCH) and the CCTrCH has a plurality of physical channels for time slot assignment.

22. The RNC of claim 19 wherein the interference measurement is measured using interference signal code power (ISCP).

23. The RNC of claim 19 wherein a value of the fragmentation parameter varies with respect to a number time slots used for the user service.

24. The RNC of claim 23 wherein a low value for the fragmentation parameter indicates a preference for assigning to the number of time slots of that fragmentation parameter and a high value indicates a preference against assigning to the number of time slots of that fragmentation parameter.

25. The RNC of claim 23 wherein the fragmentation parameter values are based on in part overall interference levels and capacity.

26. The RNC of claim 23 wherein an infinite value for the fragmentation parameter indicates a prohibition against assigning to the number of time slots of that fragmentation parameter.

27. The RNC of claim 26 wherein $C_{UE}$ is a maximum number of time slots associated with a user service, assigning channels of a user service to j time slots has the fragmentation parameter of $P_j$, an incremental penalty value is p, the $P_j$ is determined by $$P_j = \begin{cases} p \cdot j, \text{ where } j \leq C_{UE} \\ \infty, \text{ where } j > C_{UE} \end{cases}.$$

* * * * *

UNITED STATES PATENT AND TRADEMARK OFFICE
CERTIFICATE OF CORRECTION

PATENT NO. : 6,714,523 B2 Page 1 of 1
DATED : March 30, 2004
INVENTOR(S) : Zeira et al.

It is certified that error appears in the above-identified patent and that said Letters Patent is hereby corrected as shown below:

Column 9,
Lines 10 and 60, after the word "number", insert -- of -- .

Column 10,
Line 42, after the word "number", insert -- of --.

Signed and Sealed this

Seventh Day of September, 2004

JON W. DUDAS
*Director of the United States Patent and Trademark Office*